United States Patent [19]

von Fabris et al.

[11] 4,087,710

[45] May 2, 1978

[54] PULSE TRAIN DISC

[75] Inventors: Wilhelm von Fabris, Neubiberg;
Peter Wentzel, Augsburg, both of
Germany

[73] Assignee: Siemens Aktiengesellschaft, Berlin &
Munich, Germany

[21] Appl. No.: 770,293

[22] Filed: Feb. 22, 1977

[30] Foreign Application Priority Data

Mar. 31, 1976 Germany ........................ 7610024[U]

[51] Int. Cl.² ............................................ H02K 19/20
[52] U.S. Cl. ...................................... 310/168; 310/155
[58] Field of Search ............... 310/155, 168, 169, 170, 310/111, 261

[56] References Cited

U.S. PATENT DOCUMENTS

| 2,110,144 | 3/1938 | Durkee et al. ...................... 310/152 |
| 2,718,603 | 9/1955 | McLean ................................ 310/155 |
| 3,312,883 | 4/1967 | Reich .................................... 318/132 |
| 3,530,323 | 9/1970 | Applequist ........................... 310/168 |

Primary Examiner—Donovan F. Duggan
Attorney, Agent, or Firm—Hill, Gross, Simpson, Van Santen, Steadman, Chiara & Simpson

[57] ABSTRACT

A rotatable clock disc of soft magnetic material has one or more teeth arranged in an asymmetrical graduation at the periphery for use as a pulse generator with a field plate differential sensing component. Each tooth is in the form of a flap formed by a pair of radially extending cuts spaced apart an interval greater than the width of the sensing component. The flap is bent so as to extend generally parallel to the plane of the disc and provides balance of the disc when rotated.

4 Claims, 2 Drawing Figures

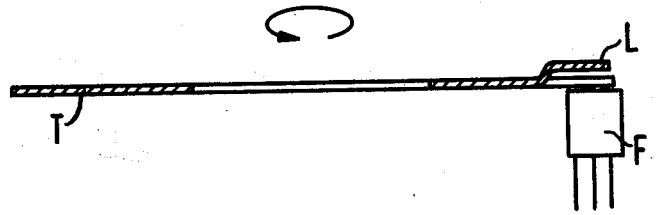
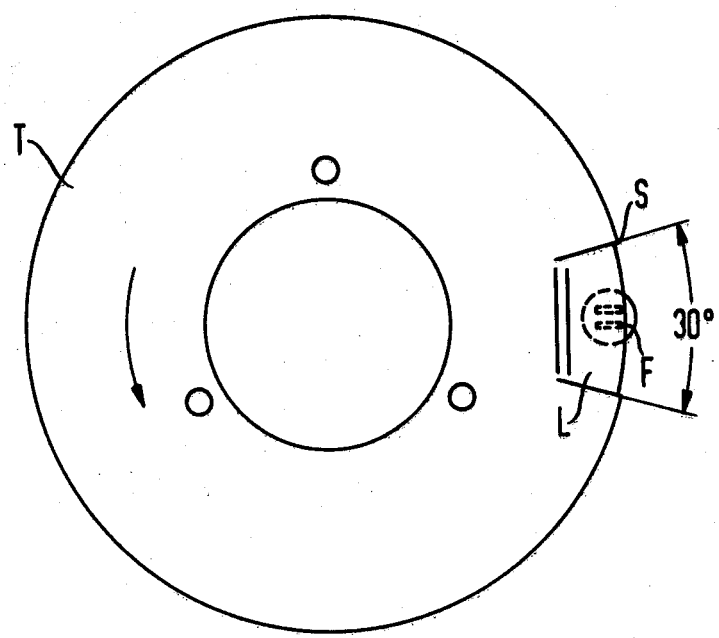

PULSE TRAIN DISC

BACKGROUND OF THE INVENTION

1. Field of the Invention

The present invention relates to a pulse generator having a field plate differential sensing element, and more particularly to a clock disc which consists of soft magnetic material and which has teeth arranged in asymmetrical graduation at the periphery thereof.

2. Description of the Prior Art

As the write/read heads in disc memories do not exhibit a stable flight characteristic until a specific speed of rotation is attained, and only then can be allowed to be loaded into the stack of discs, and on the undershooting of the limiting rotating speed must immediately be unloaded again, it is necessary to monitor the rotating speed of the stack of discs and the direction of rotation in disc memories. When write/read heads are loaded, an incorrect direction of rotation of the stack of discs will, because of the then negative angle of pitch of the flying body, lead to the immediate destruction of the write/read heads and of the stack of discs. The deceleration of the stack of discs on disconnection also necessitates the monitoring of the existence of a rotating movement of the stack, as it is this movement which is evaluated as a criterion for the connection of the retarding potential to the drive motor during the disc connection process. Such a monitoring signal can also be used for an optical display of the presence of a rotating movement of the stack, and for the mechanical unlocking of the device cover and sundry ancillary operations.

The problem of establishing a rotating movement, the direction of rotation and the rotating speed of a component occurs not only, however, in the case of stacks of discs in disc memories, but wherever rotating components are to be monitored in respect of rotating speed and direction of rotation.

In order to establish the rotating speed, the direction of rotation and the existence in itself of a rotating movement, it has become known in the art to utilize a disc, called a clock disc, which is connected to the rotating component and whose movement and position is sensed by a measuring sensing component and is analyzed in an analysis circuit.

It has also become known to establish the rotating speed and the direction of rotation with the use of arrangements which consists of a permanent magnet and a field plate differential sensing component. In these arrangements, magnetic control fields are not, as is usually done, supplied from the exterior of the arrangement, but a soft magnetic gear arrangement influences the inner magnetic circuit of the field plate differential sensing element in such a manner that changes in air gaps give rise to a reversal of flux and therefore give rise to changes in reluctance in the field plates, as a result of which high signal voltages per tooth are produced.

In devices which operate with field plate differential sensing components of this type, the teeth at the periphery of the clock discs are generally recesses of rectangular or trapezoidal shape which extend into the disc from the periphery. Teeth having this shape are advantageous wherever a pulse train disc must possess a plurality of teeth. If, however, as for example in the case of disc memories, it is expedient for the clock disc to have only a single tooth, or a few teeth, arranged in asymmetrical graduation, because of the resultant imbalance of the disc, it is no longer readily possible to utilize this known design of the clock disc.

SUMMARY OF THE INVENTION

Therefore, the primary object of the present invention is to provide a clock disc which, on the one hand, possesses only one single tooth, or a few teeth arranged in asymmetrical graduation, but on the other hand exhibits virtually no imbalance.

According to the invention, the above object is achieved that the tooth, or teeth, are formed by a radial slotting of the edge of the disc at intervals which somewhat exceed the width of the field plate differential sensing component and by bending upwards that part located between the slots. For use in disc memories, it has proved particularly advantageous to provide the disc with only two slots arranged spaced apart by approximately 30° and with a part which is bent upwards located between the two slots.

This design of the disc, in accordance with the present invention, has the advantage that the clock disc exhibits virtually no imbalance, since the slotting of the edge of the disc and the bending upwards of the part lying between the slots does not remove any material, the slots being merely cuts which separate the material, the intervening material being simply slightly displaced in the axial direction.

BRIEF DESCRIPTION OF THE DRAWING

Other objects, features and advantages of the invention, its organization, construction and operation will be best understood from the following detailed description taken in conjunction with the accompanying drawings, on which:

FIG. 1 is an elevation section taken substantially along the parting line I—I of FIG. 2; and FIG. 2 is a top plan view of a clock disc constructed in accordance with the present invention.

DESCRIPTION OF THE PREFERRED EMBODIMENTS

Referring to FIGS. 1 and 2, a clock disc is generally designated T and comprises a ring of soft magnetic material which is mounted for rotation about an axis as indicated by the curved arrows in FIGS. 1 and 2. The clock disc T includes a pair of slots S spaced at 30° which is greater than the width of a cooperating field plate differential sensing element F. Between the slots S is a part L which is bent twice so that the plane of the part L is parallel to the plane of the remaining portion of the disc. Inasmuch as the slots S are merely radial cuts in the material, and as no material is removed, there is virtually no imbalance of the clock disc T as it rotates.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A clock disc for use with a field plate differential sensing element having a predetermined width, said clock disc comprising:

a disc of soft magnetic material having an axis of rotation, at least one tooth at the periphery of said disc defined by a pair of radial cuts in the edge of said disc spaced apart a distance greater than the predetermined distance to form a flap, said flap displaced from the plane of the disc such that said disc is balanced when rotated about its axis.

2. The clock disc of claim 1, wherein the radial cuts are spaced at approximately 30°.

3. The clock disc of claim 1, wherein said disc is planar and said flap is also planar and is bent to extend parallel to the plane of said disc.

4. A clock disc for use with a field plate differential sensing element having a predetermined width, said clock disc comprising:

a disc of soft magnetic material having an axis of rotation, a plurality of teeth at the periphery of said disc each defined by a pair of radial cuts in the edge of said disc spaced apart a distance greater than the predetermined width to form a flap, each pair of radial cuts spaced from each other pair of radial cuts so as to be asymmetrically disposed about the disc, each of said flaps displaced from the plane of the disc such that said disc is balanced when rotated about its axis.

* * * * *